United States Patent [19]

Thierbach et al.

[11] 4,308,499
[45] Dec. 29, 1981

[54] METHOD UTILIZING ELECTROMAGNETIC WAVE PULSES FOR DETERMINING THE LOCATIONS OF BOUNDARY SURFACES OF UNDERGROUND MINERAL DEPOSITS

[75] Inventors: Rudolph Thierbach, Ronnenberg; Heimo Mayrhofer, Kassel-Wolfsanger, both of Fed. Rep. of Germany

[73] Assignee: Kali und Salz A.G., Kassel, Fed. Rep. of Germany

[21] Appl. No.: 53,717

[22] Filed: Jul. 2, 1979

Related U.S. Application Data

[63] Continuation of Ser. No. 910,003, May 26, 1978, abandoned, which is a continuation of Ser. No. 571,892, Apr. 25, 1975, abandoned.

[51] Int. Cl.³ .......................... G01V 3/12; G01V 3/30
[52] U.S. Cl. ...................................... 324/337; 324/338
[58] Field of Search .................. 324/334, 337, 338; 343/11, 13, 719; 455/40

[56] References Cited

U.S. PATENT DOCUMENTS

| | | | |
|---|---|---|---|
| 333,469 | 5/1943 | Martienssen | 324/337 |
| 2,077,707 | 4/1937 | Melton | 324/334 X |
| 2,657,380 | 10/1953 | Donaldson | 324/337 X |
| 2,660,703 | 11/1953 | Herbold | 324/337 |
| 3,270,276 | 8/1966 | Donaldson | 324/337 |
| 3,286,163 | 11/1966 | Holser et al. | 324/338 |
| 3,350,634 | 10/1967 | Hoehn | 324/338 |
| 3,440,523 | 4/1969 | Gabillard | 324/337 |
| 3,806,795 | 4/1974 | Morey | 324/337 |

OTHER PUBLICATIONS

Terman, Frederick, *Radio Aids to Navigation and Radar; Radio Engineering*; McGraw-Hill, 3rd Ed., 1947, Sec. 16-1, Chap. 16, pp. 783-784.

*Primary Examiner*—Gerard R. Strecker
*Attorney, Agent, or Firm*—Michael J. Striker

[57] ABSTRACT

The locations of compositional discontinuities in salt deposits and the like are determined by measuring the travel time of electromagnetic waves reflected off of boundary surfaces between underground geological regions of differing mineralogical characteristics. A spark transmitter is used to generate pulses each composed of a plurality of cycles of electromagnetic waves. The electromagnetic waves have a frequency between 1 and 500 MHz. The pulses have a pulse duration of 0.1 to 1 microsecond and a pulse repetition frequency of 10 to 1000 Hz. The thusly generated pulses of electromagnetic waves are radiated into the solid body of a mountain or other geological structure from within the interior of an underground excavation, so that the transmitted radiation will be reflected back from one or more boundary surfaces with different respective travel times. The reflected-back radiation is received and recorded. The travel times are measured, in order to determine the locations of the boundary surfaces.

2 Claims, 5 Drawing Figures

~1 SCALE UNIT = 0.01 μsec.
A SPARK SIGNAL
R REFLECTED SIGNAL

~1 SCALE UNIT = 0.01 μsec.
A  SPARK SIGNAL
$R_1$  1st REFLECTED SIGNAL
$R_2$  2nd REFLECTED SIGNAL *
$R_3$  3rd REFLECTED SIGNAL

*LOW ELECTROMAGNETIC DIFFERENTIATION BETWEEN ROCK SALT AND ADJOINING MATERIAL

METHOD UTILIZING ELECTROMAGNETIC WAVE PULSES FOR DETERMINING THE LOCATIONS OF BOUNDARY SURFACES OF UNDERGROUND MINERAL DEPOSITS

This application is a continuation of application Ser. No. 910,003 filed May 26, 1978 and since abandoned, which in turn was a continuation of application Ser. No. 571,892 filed Apr. 25, 1975 and since abandoned.

BACKGROUND OF THE INVENTION

The need in mining technology for optimal planing of the mining of an underground deposit and the need to provide for the safety of the personnel involved, combined with the desire for increased mining productivity, require more and more detailed information concerning the geologic-tectonic structure of the underground deposit itself as well as knowledge of the exact limits of the deposit.

Geological mapping provides compositional and tectonic information concerning regions actually explored. However, it is very often necessary to extrapolate from the information concerning the actually explored region, in order to develop a picture of the structure and/or composition of the adjoining unexplored regions. Effective geophysical methods which can be used underground to achieve the aforementioned goal are very much needed.

It is known to detect a compositional discontinuity in a large tectonic structure through the utilization of elastic waves, produced by explosion, hammer blows or vibration, when the elastic parameters of the geological material located on the two sides of the discontinuity are sufficiently different from each other.

These seismic exploration methods have also been used experimentally in underground applications, but in such applications they are not characterized by the same versatility, adaptability and convenience, because the requisite preparatory work and the cost and complexity of performing the requisite measurements and evaluations are far too great.

It has also been realized that different petrologically defined rock formations have different electrical parameters, and this realization has lead to a number of geoelectrical exploration methods.

None of the prior-art methods has passed beyond the status of a laboratory technique and found any wide use in the mining industry itself. The prior-art techniques involve either pure drilled bore methods performed on an electromagnetic basis aboveground and capable of detecting only individual discontinuity locations—namely individual discontinuity locations at the boundaries of the underground deposit—or else involve methods for use in the case of bed-like deposits according to which shallow drilled bores serve to support or accommodate antennas for the detection of the level of irregular bodies intermediate the bed-like deposit and the ground surface; or else involve methods which can be performed aboveground without the use of drilled holes but which aim only for information concerning the structure of shallow deposits.

In summary, the general trend of development in the prior art has been towards the solution of special-case-type problems, the detection of particular kinds of tectonic situations, and the answering of specific questions concerning a geological structure, and not towards the determination of the composition and geometry of underground deposits pretty much irrespective of their size, shape, composition and location relative to the ground surface.

The prior-art methods cannot be employed in the case of underground salt deposits. This is because the particular prior-art method involved can only lead to the answering of one or another single question concerning the composition or structure or geometry or subsurface location, and/or because the prior-art methods involve the use of complicated equipment which is difficult to move from one location to another and which, even just for reasons of space, preclude their use at any arbitrarily selected measuring location.

The known methods, for economic reasons, have found no practical application, because they necessitate very expensive preparatory and auxiliary work, such as the drilling of deep holes or holes in the actual body of the deposit, and because they are time-consuming and expensive, insofar as the use of personnel for performing measurements and evaluations is concerned.

Methods involving the drilling of holes can be used in the case of salt deposits only to a limited extent, since they cannot be employed where the region of the deposit is threatened by water and/or gas.

SUMMARY OF THE INVENTION

It is a general object of the invention to provide a method of exploring underground deposits not characterized by the disadvantages discussed above.

According to one advantageous concept of the invention, the locations of compositional discontinuities in an underground deposit is accomplished by measuring the travel time of electromagnetic waves reflected back from the boundary surfaces between underground regions having different mineralogical characteristics. This measurement of the travel time of the electromagnetic waves is performed by means of equipment of a general type which is conventional in high-frequency technology, and the exploration method of the invention is characterized, inter alia, by the use of a wireless spark transmitter which generates electromagnetic wave impulses in the frequency range of 1 to 500 MHz, with an impulse duration of 0.1 to 1 microseconds, and a pulse-repetition frequency between 10 and 1000 Hz. The electromagnetic wave impulses are radiated into the solid body of the mountain or other geological structure from passable or walkable underground tunnels, walks or other excavations, and these impulses are registered by means of a receiver arrangement such as to make possible a time resolution of 1/100 microseconds. The power and the wavelength of the emitted radiation impulses are selected as appropriate for the particular situation. By controlling the location of the antennas or by employing antennas having highly directional characteristics, it is possible to detect the reflecting boundary surfaces located within the solid body of the mountain or other geological structure.

According to a further advantageous concept of the invention, two or more compositional inhomogeneities in the solid body of the mountain, bounded by two or more planar or curving boundary surfaces, are located. In this way, it is possible to locate the boundary surfaces between rock salt and carnallite and/or anhydrite and/or salt clays and/or elastic boundary rock of a salt deposit.

According to another advantageous concept of the invention, the inventive method is used to determine the locations of boundary surfaces or layers of different mineralogical composition located between dry and water or lye-solution-bearing rock formations.

According to a further advantageous concept of the invention, the electromagnetic wave impulses are generated by a D.C.-supplied wireless spark transmitter, comprised of a battery, a high-voltage D.C. voltage generator, means defining the spark path, and a dipole antenna. The magnitude of the D.C. voltage, the spark length of the spark gap and the geometry of the transmitting antenna determine, or else by changes in them made in view of the characteristics of the geological structure being explored, effect variations in the emitted impulse power, the frequency of the emitted impulses and the impulse-repetition frequency.

According to another advantageous concept of the invention, use is made of a specially developed electromagnetic reflection detector comparable to a portable radio set and transportable and operable by one man underground even in very narrow spaces and not supplied by a separate energy source. This reflection detector assures from each measuring point the detecting of a plurality of boundary surfaces of mineralogical structures in the solid body of the mountain or other geological structure, both in the nearby range of about 10 meters and also in larger ranges up to and including about 1,000 meters; of course, the larger the range the smaller the resolution. In this way, the large number of measurements required for a routine and economical method can be made with a minimum of personnel- and time-related cost.

The inventive method is advantageously characterized by long range and by variable resolution, as well as by very short measuring and evaluation times within the selected arrangement of known pulse-radar-technology components through the novel expedient of using as the emitting source a wireless spark transmitter operating in a particular manner. With the inventive method, the reliable results of the measurements are based upon optimal matching relative to the material to be examined relative to penetration depth and the requisite resolution through operator-variable parameters, namely transmitter power, wavelength and antenna characteristics.

DESCRIPTION OF THE PREFERRED EMBODIMENT

An exemplary embodiment of the invention is described below:

The apparatus used to perform the method is comprised of a spark transmitter in the form of a single unit, the receiver arrangement, comprised of an antenna with a stand or other support, an amplifier and an oscilloscope or oscillograph as well as a registration camera.

The transmitter is comprised of a gas-tightly sealed acccumulator, a high-voltage generator formed from semiconductor components and operative for providing a 20 kV output voltage and a 0.1 mA current amplitude, a resistive voltage divider, two high-resistance resistors in the conductor paths connected to the two sides of the spark gap, a cylindrical insulating body serving as a support for the dipole antenna and for the means defining the spark gap, means defining an adjustable-spark-length spark gap, and the antenna components. The spark transmitter differs from a hertzian oscillator in the manner in which the antenna is energized. In the case of a hertzian oscillator the energization of the antenna is inductive; in the case of a wireless spark transmitter such as advantageously used to perform the inventive method, the energization is by means of a D.C. voltage. In this way, not only the pulse-repetition frequency but also above all the pulse power can be very simply controlled.

The housing of the transmitter is comprised of insulating synthetic plastic material. Elongated side walls of the housing serve as holding means for the antenna construction and as a support for the complete portable unit. The weight of the transmitter depending upon the length of the antenna amounts to less than 6 kg.

The receiving antenna is likewise designed as a sleeve-dipole antenna. The holding means is constituted by a non-metallic support or stand. The connection of the antenna to the coaxial supply cable is effected through the intermediary of a matching transformer. The subsequent amplification, in the case of a gain of 40 dB, has a bandwidth extending from 10 MHz to 100 MHz. The amplifier is comprised of transistorized circuitry and is battery-energized. The amplifier output signal is applied to a battery-driven portable oscillograph or oscilloscope (for example such as the one currently manufactured by Hewlett-Packard under the designation Type 1707 A).

The waveforms appearing on the image screen are photographed by a polaroid camera provided with a viewing hood.

Figure 3:
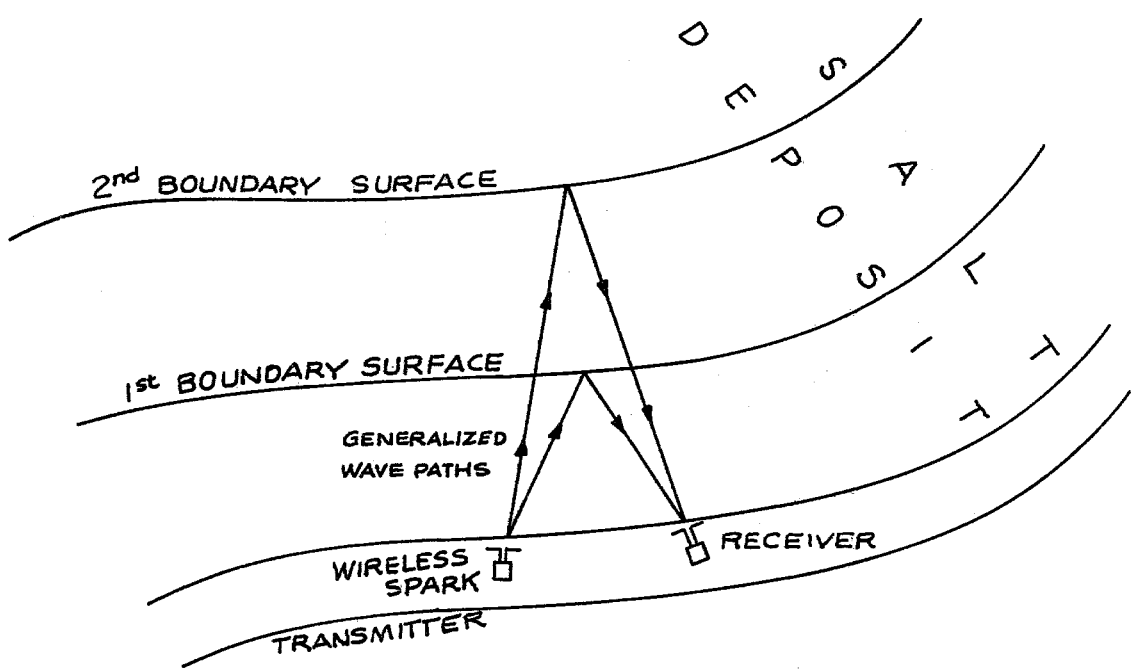
FIG. 3 depicts in a schematic manner how in accordance with the present invention the spark transmitter and receiver are disposed relative to geological boundary surfaces.
Figure 4:
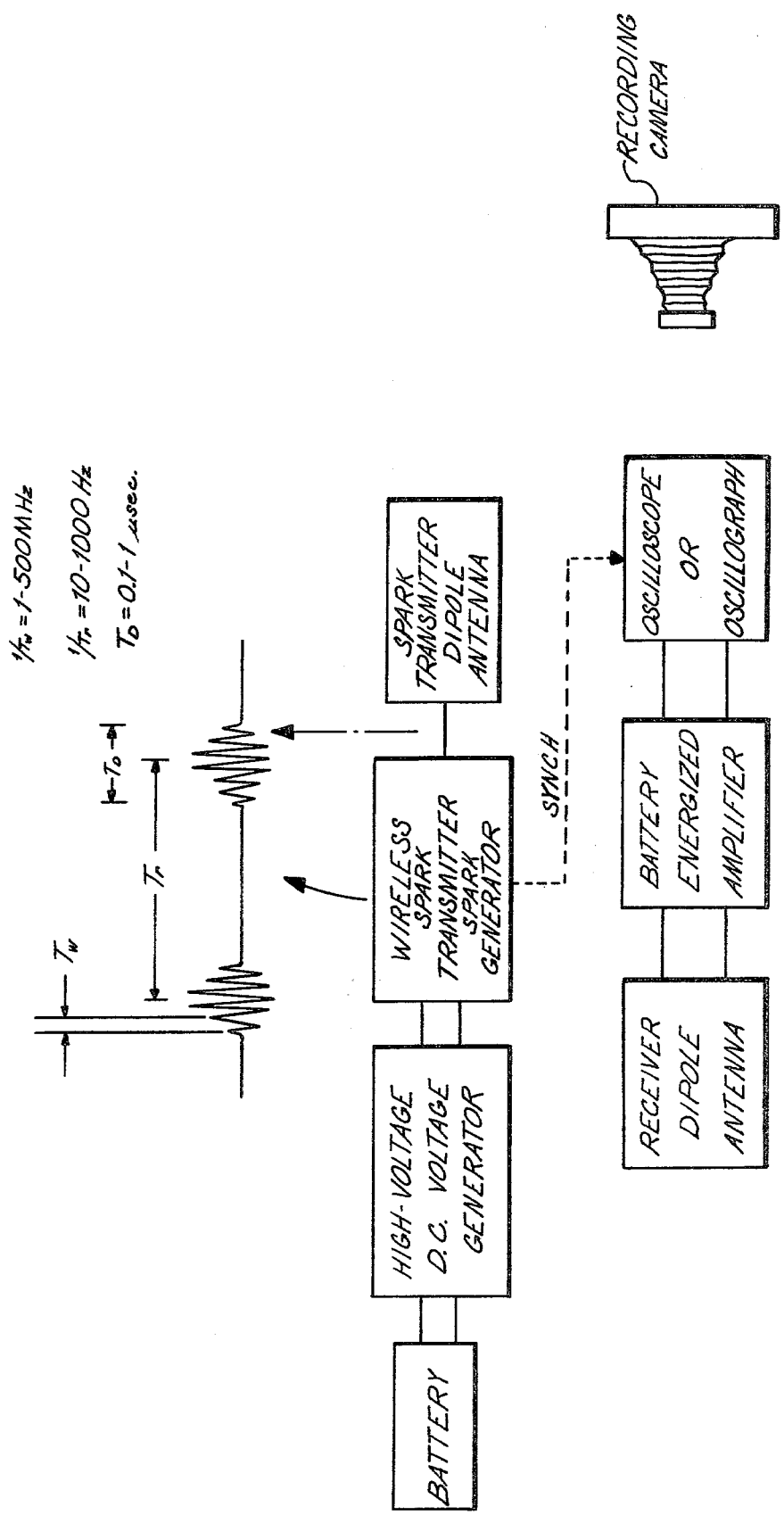
FIG. 4 is a block diagram schematically indicating the components utilized in the performance of the inventive method.

The above-described arrangement is advantageously set up as shown in FIG. 3 and itself schematically depicted in FIG. 4.

The apparatus used to perform the inventive method is preferably so designed as to take specially into consideration the requirements of the mining industry with respect to simplicity, robustness and economical versatility.

The design of the apparatus employed to perform the inventive method can be varied in correspondence to the requirements of a particular intended use or situation. Use can be made of other antenna types and constructions, such as helical antennas, yagi antennas, logarithmic-periodic antennas, antenna groups and reflector walls for improving the radiation directionality characteristics of the antenna, or else direction-finding antenna arrangements with large null position damping. Additionally, use can be made of antennas which are located at some distance from the transmitter or receiver arrangement, in order to facilitate manipulation and positioning of the arrangements and in order, for example, to facilitate insertion into any drilled holes which may be present. To externally trigger the receiver arrangement, use can be made of a signal line connected to the transmitter, which will produce a certain time delay dependent upon the length and characteristics of the cable employed. At the receiver end, use can be made of a signal detecting arrangement, for example in the form of a sampling oscillograph or oscilloscope, in order to make possible or improve the registration of high frequency signals.

A numerical example is presented below:

In a salt deposit composed of rock salt with anhydrite, salt clays and elastic boundary rock, along a path within the passable portions of the excavation, the locations of one or more boundary surfaces of the aforementioned mineral complex are determined. To this end, use is made of the above-described apparatus, with the transmitter so located that the dipole antenna thereof is located as close as possible to a wall surface of the excavation, for example 3 cm; an antenna length of 1 meter is selected; the spark length of the spark gap is 0.5 mm; the supply voltage is 10 kV. The receiver antenna is arranged at some distance from the spark transmitter (greater than 5 meters), arranged a correspondingly close distance to the same wall surface of the excavation. Then the transmitter and receiver are set into operation.

When the spark transmitter is turned on, electromagnetic radiation pulses having a time duration of 0.2 microseconds and a pulse-repetition frequency of about 100 Hz are transmitted and radiated into the mountain or other geological structure.

The received pulses, specifically the pulses radiated directly from the spark transmitter as well as the pulses reflected from the mountain or other geological structure, are displayed on the picture tube of the oscilloscope in their timewise succession in the form of a persisting oscillatory waveshape, in half scale units, i.e., in 1/100 microseconds, then measured and photographically registered.

Figure 1:
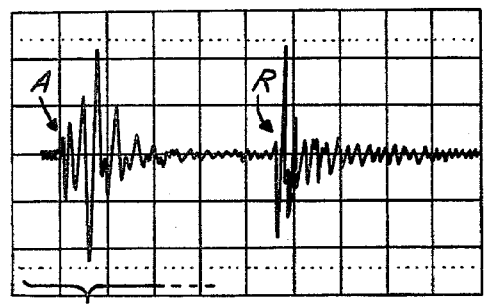
FIGS. 1 and 2 depict, graphically, the registration of two measurements, as performed in accordance with the principle of travel-time measurement of distance.
Figure 2:
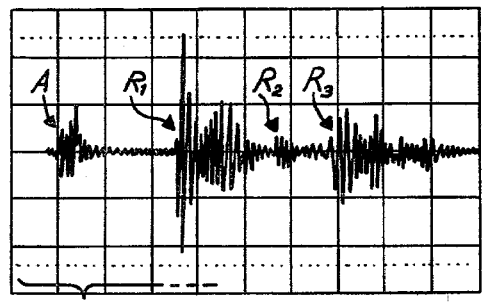

FIGS. 1 and 2 show the registration of two measurements, with the primary impulse as well as the reflection components being designated A and R, or A, R1 and R2. The scale makes possible accurate reading to one-half a scale division.

From the indicated travel time between A and R the distance to the reflecting boundary surface can be determined in dependence upon the propagation speed of electromagnetic waves and the distance between the transmitter and the receiver.

In this example, the requisite transmitter power, the requisite spark length of the spark gap as well as the antenna length required to achieve an optimal reflection image (oscilloscope) are set in advance.

The determination of the location of the reflecting boundary layer in the solid body of the mountain or other geological structure is performed, in this example (a) through repeated measurements with changes in the location of the receiver antenna, and (b) through the taking of maximum-minimum bearings by means of the receiver dipole used in this example, with the radiation of the transmitted impulses one after the other being in two orthogonal polarization planes. This is accomplished by rotating the transmitter antenna. An explanation of how this is performed can be found, for example, in H.-J. Reich et al., "Very High-Frequency Techniques", McGraw-Hill, 1947; the technique of "direction finding" is per see very well known in the art, although deemed novel in the context of the present invention. In the context of the present invention, reflections from all directions of the solid body of the mountain or other geological structure must be registered.

The second example illustrates, with the same set-up of the spark transmitter and of the receiver but at a different location, two reflections (R1, R2). The determination of the location in space of the reflecting boundary surfaces is confirmed by drilling bores. A maximum of 5 minutes is required for each measurement at a particular location.

Figure 5:
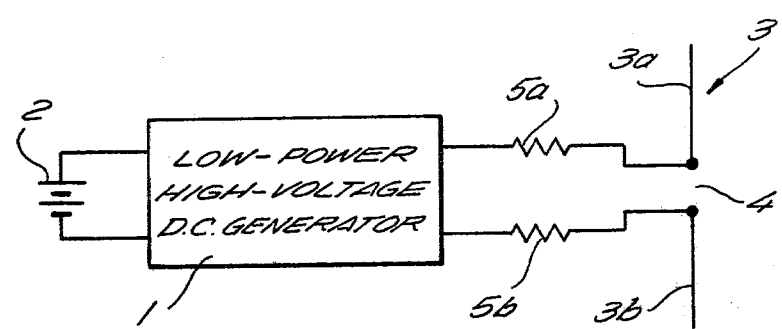
FIG. 5 depicts the spark transmitter used in accordance with the present invention.

An equally simple as effective solution was found using a spark-transmitter, shown in FIG. 5, with an antenna coupling different from that of the Hertz-arrangement. It generates short powerful pulses. This transmitter is made up of a high-voltage low power DC generator 1 supplied by a battery 2 and a dipole-antenna 3 whose two antenna elements 3a, 3b define a variable spark gap 4 in the middle. The antenna 3 is connected with the D.C. generator 1 by high resistors 5a and 5b. The charging procedure of the antenna which depends on the supply voltage, the resistivity and the static antenna capacity C, is interrupted as soon as the ignition voltage $U_z$ of the spark gap is reached. During sparking a high frequency oscillation is set off, which is strongly attenuated by the spark-resistance of the electric arc and is therefore of very short duration. This is periodically repeated.

The measured pulse time is about 0.2 μs. The average pulse output can be estimated from:

$$p = k\, CU_z^2/2t$$

where k is the efficiency of the generator resulting from the heat loss of the spark gap. For values of $k=0.1$; $C=100$ pF; $U_z=2$ kV; $t=0.2$ μs an average output of 100 W can be found.

With this configuration, even reflectors more than 500 m away have been located. On the other hand, these short pulses make it also possible to locate reflectors which are less than 20 m away.

The frequency of this apparatus is solely controlled by the dipole antenna. By changing its length the frequency range may be shifted. It is equally simple to match the emitted pulse output to the required penetration range by changing the sparkover path. The pulse sequence frequency can be altered by changing the feeding potential in such a way that the operator sees a standing wave on the oscilloscope.

The waves are recorded on an oscilloscope with a sufficiently high frequency cut off. It receives the signals from a receiving antenna through an adjustable network and if necessary a broadband amplifier. The frequency characteristic of the receiving antenna influences the signal; a very broadband antenna would be ideal. Moreover, extended antennas with strong directional characteristics are necessary for spatial location of the reflectors. But as these measurements are often made in narrow adits, limiting the size of the antenna, a compromise has to be made.

The transmitter and receiver are battery powered and easily portable. The measurements entail no preparations. The antenna configuration at the salt-wall is, with respect to the electrical coupling, not particularly critical; all measurements are reproduceable.

The complete separation of transmitter and receiver makes it possible to operate in much the same way as in seismic investigations. By profiling in 1, 2 or 3 dimensions, travel-time curves can be obtained from which the distance and the position of the reflectors can be calculated.

The inventive method, compared to be methods of the prior art, offers the following technical and economical advantages: It assures for the first time the location of every sufficiently electrically differentiated discontinuity in the solid body of a mountain or other geological structure, without limitations relative to the location in space of the tectonic elements to be located and without limitations relative to the penetration depth within a range from about 10 m to 1000 m. It affords, through essential simplification of the transmitting and receiving apparatus, a procedure which leads in the shortest time to an evaluatable measurement. The inventive method is economical to a degree not hitherto approached, because the measurements do not require any significant preparatory work or auxiliary work and can be performed by a single person.

We claim:

1. A method of determining the location or locations of one or more compositional discontinuities in salt deposits by measuring the travel time of electromagnetic waves reflected off of boundary surfaces between underground bodies of differing mineralogical characteristics, the method comprising generating powerful pulses of electromagnetic waves such that the waves have a frequency between 1 and 500 MHz, the pulses formed by the electromagnetic waves having a pulse duration of 0.1 to 1 microsecond and a pulse-repetition frequency of 10 to 1000 Hz, and radiating the thusly generated pulses of electromagnetic waves into the solid body of a mountain or other geological structure from within the interior of an underground excavation, said generating and radiating of powerful pulses of electromagnetic waves comprising the following procedure:

positioning a dipole antenna having a spark gap defined by its two antenna elements close to but not in contact with a wall of the underground excavation, building up a static charge on the two antenna elements of the dipole antenna by connecting the output of a high-voltage low-power D.C. generator across the two antenna elements via two high-resistance charging resistors each connected to a respective one of the two antenna elements of the dipole antenna, so that the high-voltage low-power D.C. generator furnishes energy at low power to the dipole antenna, the resulting increase of static energy on the antenna elements eventually reaching the ignition voltage of the antenna's spark gap, whereupon the static charge on the two antenna elements is rapidly dissipated due to attenuation resulting from the antenna spark gap's electric arc spark resistance thereby producing from the energy previously supplied to the antenna by the lower-power D.C. generator a higher-power pulse of electromagnetic waves, and then recommencing the build-up of static charge on the antenna from the low-power D.C. generator until another such pulse of electromagnetic waves is produced, and repeating this procedure to produce a series of such pulses, the radiation transmitted from the dipole antenna being reflected back from the one or more boundary surfaces with different respective travel times; and receiving the reflected-back radiation utilizing a receiving antenna positioned close to but not in contact with a wall of the underground excavation and making a recording thereof.

2. The method defined in claim 1, furthermore comprising the step of varying at least one of the following quantities: the repetition frequency of the pulses, the radiated power of the pulses, and the frequency of the electromagnetic waves of which the pulses are constituted, by varying at least one of the following: the length of the dipole antenna's spark gap, the length of the dipole antenna, and the output power of the high-voltage low-power D.C. generator.

* * * * *